United States Patent
Yang et al.

(10) Patent No.: US 11,514,660 B1
(45) Date of Patent: Nov. 29, 2022

(54) SCENE RECOGNITION METHOD, TRAINING METHOD AND DEVICE BASED ON PYRAMID ATTENTION

(71) Applicant: Huazhong University of Science and Technology, Hubei (CN)

(72) Inventors: You Yang, Hubei (CN); Ruofei Xiong, Hubei (CN); Qiong Liu, Hubei (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 17/835,361

(22) Filed: Jun. 8, 2022

(30) Foreign Application Priority Data

Nov. 19, 2021 (CN) .......................... 202111372903.9

(51) Int. Cl.
*G06K 9/00* (2022.01)
*G06V 10/42* (2022.01)
*G06V 10/44* (2022.01)
*G06T 3/40* (2006.01)
*G06V 10/82* (2022.01)
*G06V 10/80* (2022.01)

(52) U.S. Cl.
CPC ............... *G06V 10/42* (2022.01); *G06T 3/40* (2013.01); *G06V 10/44* (2022.01); *G06V 10/806* (2022.01); *G06V 10/82* (2022.01)

(58) Field of Classification Search
None
See application file for complete search history.

(56) References Cited

U.S. PATENT DOCUMENTS

2022/0254134 A1* 8/2022 Ren .................. G06V 10/22

FOREIGN PATENT DOCUMENTS

CN 113408590 A 9/2021

OTHER PUBLICATIONS

Andreas Maier, Visualization & Attention—Part 5, Attention Mechanisms, https://towardsdatascience.com/visualization-attention-part-5-2c3c14e60548, Jul. 29, 2020 (Year: 2020).*
Chen et al., PAM: Pyramid Attention Mechanism Based on Contextual Reasoning, IEEE Access (Year: 2017).*

* cited by examiner

*Primary Examiner* — Randolph I Chu
(74) *Attorney, Agent, or Firm* — Hamre, Schumann, Mueller & Larson, P.C.

(57) ABSTRACT

The present invention discloses a scene recognition method, a training method and a device based on pyramid attention, belonging to the field of computer vision. The method includes: pyramid layering a color feature map and a depth feature map respectively, calculating the corresponding attention map of each layer; taking the output of the attention of the last layer as the output; taking the attention output of the last layer as the final feature map, for the remaining layers, adding the result after upsampling of the final feature map of an upper layer to the attention output of this layer as the final feature map of this layer; scaling the attention map and the final feature map, using the average of two new attention maps as the final attention map, mapping the largest k position in the final attention map to the final feature map of this layer.

7 Claims, 3 Drawing Sheets

SCENE RECOGNITION METHOD, TRAINING METHOD AND DEVICE BASED ON PYRAMID ATTENTION

TECHNICAL FIELD

The present invention relates to the field of computer vision, and more particularly, relates to a scene recognition method, a training method and a device based on pyramid attention.

BACKGROUND ART

Indoor scenes usually contain numerous objects with diverse spatial layouts. Thus, obtaining a robust indoor scene representation is a difficult task. In addition, the Depth map can provide information on spatial layout and geometric location; RGB-D scene recognition has been developed rapidly in recent years. However, global features are not sufficient to represent complex indoor scenes. In addition, using local object-based features to represent scenes can avoid noisy information in some scenes, and using local or global features alone may lead to poor recognition performance. At the same time, not all objects contribute to the scene recognition, which requires the designed model to adaptively select features that are critical for scene recognition. Moreover, the semantic gap between these two modalities is also an aspect that cannot be ignored. Thus, how to effectively realize multi-modal fusion still needs to be explored further.

Chinese patent CN113408590A discloses a scene recognition method, a training method, a device, an electronic apparatus and a program product based on a graph convolutional network (GCN). In this method, on the basis of extracting the global features of the two modal images, the spatial attention mechanism is used to extract the important local features of the color map and depth map, and the graph convolution network can be used to aggregate and update the local features of the two modal images in order to reduce the semantic gap between the two modalities, thereby improving the accuracy of scene recognition.

However, this method only considers local features at a single scale, and is not suitable for indoor scenes with a wide variety of objects and diverse layouts.

SUMMARY OF THE INVENTION

In view of the defects and improvement requirements in the existing techniques, the present invention provides a scene recognition method, a training method, a device, an electronic apparatus and a computer-readable storage medium based on pyramid attention, aiming at solving the technical problem in the existing technique that local features of a single scale are not enough to express complex indoor scenes.

In order to achieve the above object, in a first aspect, the present invention provides a method for scene recognition based on pyramid attention, the method comprises:

acquiring a color image and a depth image of a scene to be recognized, and performing feature extraction respectively to obtain a corresponding color feature map (i.e. RGB modality) and a depth feature map (i.e. D modality); performing feature transformation on the color feature map and the depth feature map respectively to obtain corresponding color global features and depth global features; performing pyramid layering on the color feature map and the depth feature map respectively, and calculating an attention map and an attention output corresponding to each layer based on an attention mechanism; taking an attention output of a last layer as a final feature map of the last layer, and for remaining layers, adding a result of upsampling a final feature map of an upper layer to an attention output of this layer as a final feature map of this layer; scaling the attention map and the final feature map of each layer of the layers to obtain two new attention maps; using averages of the two new attention maps as a final attention map, and mapping a largest k position in the final attention map to the final feature map of this layer to obtain local features of this layer; and fusing the color global features, the depth global features and the local features of each layer to obtain multi-modal features of the scene to be recognized, and then perform scene recognition based on the multi-modal features.

Further, the scaling of the attention map and the final feature map of each layer of the layers to obtain the two new attention maps comprises: performing summation and reshape operations along a column direction on the attention map corresponding to each layer of the layers to obtain a new attention map; and performing a two-dimensional convolution operation on the final feature map corresponding to each layer of the layers to obtain another new attention map.

Further, the fusing of the color global features, the depth global features and the local features of each layer to obtain the multi-modal features of the scene to be recognized comprises: performing a semantic-based feature fusion on the local features of each layer with a GCN algorithm to obtain the final local features; and fusing the color global features, the depth global features and the final local features to obtain the multi-modal features of the scene to be recognized.

Further, the performing of the semantic-based feature fusion on the local features of each layer with the GCN algorithm to obtain the final local features comprises: respectively creating a color map structure and a depth map structure based on the local features of each layer of the color feature map and the local features of each layer of the depth feature map, wherein the color map structure is configured to represent a positional relationship between object nodes in the color image, and the depth map structure is configured to represent a positional relationship between object nodes in the depth image; employing sparse connections to connect nodes in each layer in the color map structure based on features of the nodes in the color map structure, and obtaining a first local feature by means of aggregation and update operations of the GCN algorithm; employing sparse connections to connect nodes in each layer in the depth map structure based on features of the nodes in the depth map structure, and obtaining a second local feature by means of aggregation and update operations of the GCN algorithm; employing sparse connections to connect the nodes in each layer in the color map structure with the nodes in each layer in the depth map structure based on the features of the nodes in the color map structure and the features of the nodes in the depth map structure, and obtaining a third local feature by means of aggregation and update operations of the GCN algorithm; and performing a concatenation operation and feature transformation on the first local feature, the second local feature, and the third local feature to obtain the final local features.

In a second aspect, the present invention provides a method for training a scene recognition model, and the method comprises: acquiring a training data set, wherein the training data set comprises at least one set of color training images, depth training images, and scene class labels of a training scene; and using the training data set to train a preset scene recognition model so as to obtain a trained scene recognition model, wherein the trained scene recognition model is used to process color training images and depth training images according to the scene recognition method set forth in any part of the first aspect.

Further, the using of the training data set to train the preset scene recognition model comprises: inputting the color training images and the depth training images into the preset scene recognition model to enable the preset scene recognition model to perform feature extraction on the color training images and the depth training images respectively, so as to obtain the color global training features corresponding to the color training images, the deep global training features corresponding to the depth training images, and the local training features of each layer; and fusing the color global training features, the depth global training features and the local training features of each layer to obtain the multi-modal training features of the training scene; and performing a parameter adjustment process on the preset scene recognition model based on cross-entropy loss functions of the multi-modal training features and the scene class labels until the training is completed.

In a third aspect, the present invention provides an apparatus for scene recognition based on pyramid attention, the apparatus comprises: a first image acquisition module, which is configured to acquire a color image and a depth image of a scene to be recognized, and perform feature extraction respectively to obtain a corresponding color feature map and a depth feature map; a global feature acquisition module, which is configured to perform feature transformation on the color feature map and the depth feature map respectively to obtain corresponding color global features and depth global features; a local feature acquisition module, which is configured to perform pyramid layering on the color feature map and the depth feature map respectively, and calculate an attention map and an attention output corresponding to each layer based on an attention mechanism; take an attention output of a last layer as a final feature map of the last layer, and for remaining layers, add a result of upsampling a final feature map of an upper layer to an attention output of this layer as a final feature map of this layer; scale the attention map and the final feature map of each layer of the layers to obtain two new attention maps; use averages of the two new attention maps as a final attention map, and map a largest k position in the final attention map to the final feature map of this layer to obtain local features of this layer; and a fusion and recognition module, which is configured to fuse the color global features, the depth global features and the local features of each layer to obtain multi-modal features of the scene to be recognized, and then perform scene recognition based on the multi-modal features.

In a fourth aspect, the present invention provides a training apparatus for a scene recognition model, the apparatus comprises:

a second image acquisition module, which is configured to acquire a training data set, wherein the training data set comprises at least one set of color training images, depth training images, and scene class labels of a training scene; and a training module, which is configured to use the training data set to train a preset scene recognition model so as to obtain a trained scene recognition model, wherein the trained scene recognition model is used to process color training images and depth training images according to the scene recognition method set forth in any part of the first aspect.

In a fifth aspect, the present invention provides an electronic device, the device comprises a memory and at least one processor; the memory storing computer-executable instructions; and the at least one processor executing the computer-executable instructions stored in the memory to cause the at least one processor to perform the scene recognition method set forth in any part of the first aspect, or cause the at least one processor to perform the method for training a scene recognition model according to any part of the second aspect.

In a sixth aspect, the present invention provides a computer-readable storage medium, the computer-readable storage medium stores computer-executable instructions, so as to implement the scene recognition method set forth in any part of the first aspect, or implement the method for training a scene recognition model according to any part of the second aspect.

In general, through the above technical solutions provided by the present invention, the following beneficial effects can be achieved in the present invention:

After extracting the features of the color images and the depth images of the scene to be recognized, the present invention performs pyramid layering on the color feature map and the depth feature map respectively, and the attention map and the attention output corresponding to each layer are calculated based on an attention mechanism; the attention output of the last layer is taken as the final feature map of the last layer; for the remaining layers, the result from upsampling of the final feature map of an upper layer is added to the attention output of this layer as the final feature map of this layer; next, the corresponding attention map and final feature map of each layer of the layers are scaled to obtain two new attention maps; the average(s) of the two new attention maps are taken as the final attention map, and the largest k position in the final attention map is projected to the final feature map of this layer to obtain the local features of this layer; next, the local features of each layer are further fused to obtain the final local features. Compared with the existing method for obtaining local features, the present invention can extract local features with long-term dependence. Thus, it can better express complex indoor scenes. Therefore, after fusing global features and local features, the accuracy of scene recognition can be improved.

DETAILED DESCRIPTION

To make the objects, technical solutions and advantages of the present invention clear, the present invention will be further described in detail below with reference to the accompanying drawings and embodiments. It should be understood that the specific embodiments described herein are only used to explain the present invention, but not to limit the present invention. In addition, the technical features involved in the various embodiments of the present invention as described below can be combined with each other as long as there is no conflict with each other.

In the present invention, the terms "first," "second" and the like (if present) in the present invention and the accompanying drawings are to distinguish similar objects, and are not necessarily used to describe a specific order or sequence.

Embodiment I

Figure 1:
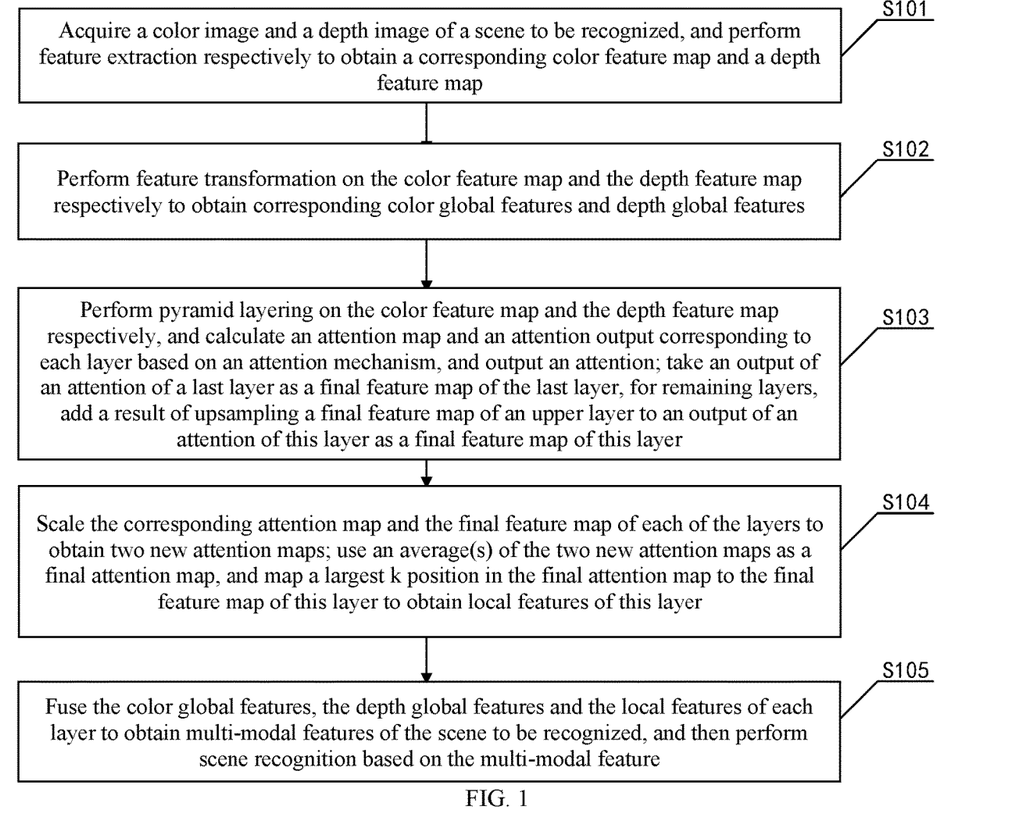
FIG. 1 is a schematic flowchart of a method for scene recognition based on pyramid attention provided by an embodiment of the present invention.

With reference to FIG. 1, an embodiment of the present invention provides a method for scene recognition based on pyramid attention, including the following steps:

S101: Acquire a color image and a depth image of a scene to be recognized, and perform feature extraction respectively to obtain a corresponding color feature map and a depth feature map.

In this embodiment, the feature extraction algorithm may be the ResNet101 algorithm, the VGG algorithm, or the AlexNet algorithm, or the like. Through the above feature extraction algorithm, the corresponding color feature map and depth feature map can be obtained.

S102: Perform feature transformation on the color feature map and the depth feature map respectively to obtain corresponding color global features and depth global features.

In this embodiment, two fully connected layers of a preset feature extraction network are used to perform feature transformation on the color feature map and the depth feature map respectively, so as to obtain corresponding color global features and depth global features.

S103: Perform pyramid layering on the color feature map and the depth feature map respectively, and calculate an attention map and an attention output corresponding to each layer based on an attention mechanism; take an attention output of a last layer as a final feature map of the last layer, and for remaining layers, add a result of upsampling a final feature map of an upper layer to an attention output of this layer as a final feature map of this layer.

It should be noted that the number of layers of the pyramid can be selected according to the actual experimental effects. If the number of selected layers is too low, it is not enough to express the multi-level features; while if the number of selected layers is too high, this will involve more computation. In this embodiment, the general number of pyramid layers is selected to be 3 layers. In practical applications when this invention is being used, the number of pyramid layer can be set as 3 or other numbers. In addition, in the present invention, the Transformer is used as an attention mechanism to capture non-local dependencies, which can also be replaced by other attention mechanisms.

Figure 2:
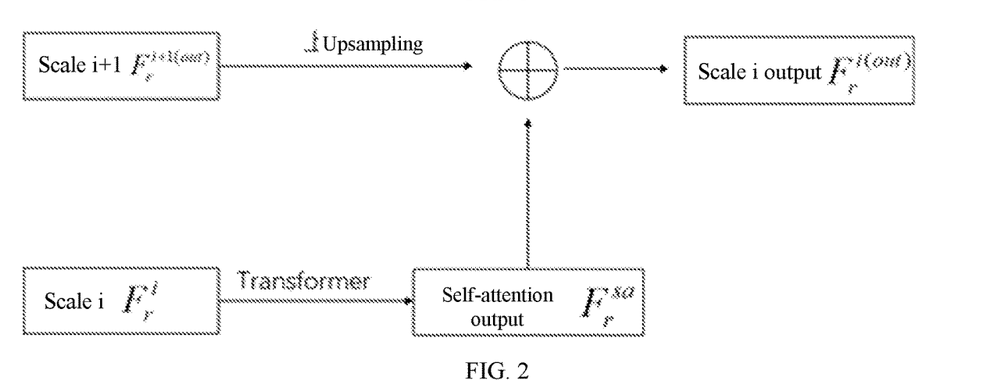
FIG. 2 is a schematic flowchart of calculating a final feature map of each layer according to an embodiment of the present invention.

The last layer feature maps of the two modalities of RGB and depth are represented by $F_r$ and $F_d$, respectively. The size is (B,C,H,W), where B represents the batch size in the training, C represents the number of channels, and H and W represent the height and width of the feature, respectively. Taking the RGB image as an example, as shown in FIG. 2, we use $F_r^i$ and $F_r^{i+1}$ as the features of the I scale and i+1 scale of the pyramid, and use two-scale convolution to calculate Q, K, and V in the Transformer structure so as to obtain the attention map:

$$SA_r = \text{soft max}(Q*K^T)$$

where T represents the transpose operation, and the softmax activation function is used to regularize the computed attention map.

The final self-attention output $F_r^{sa}$ can be calculated by the following formula:

$$F_r^{sa} = SA_r * V$$

Low-resolution feature maps usually contain more semantic information, while high-resolution feature maps have richer spatial information. Thus, the two can complement each other. Therefore, fusing features of different scales would be more conducive to the selection of subsequent key features.

After obtaining the attention map and the output of the attention corresponding to each layer, the output of the attention of the last layer is used as the final feature map of the last layer; for the remaining layers, the result of upsampling the final feature map of an upper layer is added to the output of the attention of this layer as the final feature map of this layer. As shown in FIG. 2, the result of upsampling of the final feature map $F_r^{i+1(out)}$ of an upper layer and the output $F_r^{sa}$ of the attention of this layer are added as the final feature map of this layer $F_r^{i(out)}$:

$$F_r^{i(out)} = \mu(F_r^{i+1(out)}) + F_r^{sa}$$

where $\mu$ represents an upsampling operation.

S104: Scale the corresponding attention map and the final feature map of each of the layers to obtain two new attention maps; use an average(s) of the two new attention maps as a final attention map, and map a largest k position in the final attention map to the final feature map of this layer to obtain local features of this layer.

In this embodiment, since there is no accurate label information of key features in the scene, it is difficult to directly train the network model to find the key features. Even if the attention mechanism is used, it is still difficult to acquire effective features in a complex indoor scene without relevant constraints. In order to ensure the effectiveness of node selection, the corresponding attention map and final feature map of each layer of the layers are subjected to scale conversion so as to obtain two new attention maps $SA_r^F$ and $SA_r^S$:

$$SA_r^F = \text{Re}(\text{Sum}(SA_r))$$

$$SA_r^S = \text{Conv}_{2D}(F_r^{i(out)})$$

where Re and Sum represent the reshape operation and the sum along the column direction, respectively, $\text{Conv}_{2D}$ represents the two-scale convolution operation, m represents the number of layers of the pyramid attention; to enforce similar spatial locations of the two attention maps during the training, we can obtain efficient key feature representations at the pyramid scale i.

Finally, the average of the two new attention maps $SA_r^F$ and $SA_r^S$ is used as the final attention map, and the largest k position in the final attention map is then mapped to the final feature map of this layer so as to obtain the local features of this layer.

S105: Fuse the color global features, the depth global features and the local features of each layer to obtain multi-modal features of the scene to be recognized, and then perform scene recognition based on the multi-modal feature.

Further, the GCN algorithm is used to perform semantic-based feature fusion on the local features of each layer to obtain the final local features, and then the color global features, the depth global features and the final local features are fused to obtain the multi-modal feature(s) of the scene to be recognized.

Figure 3:
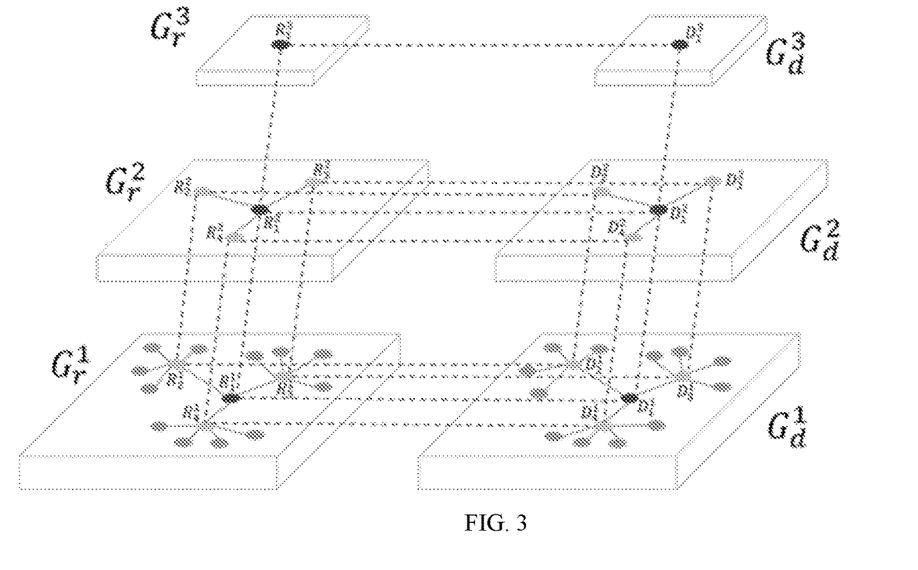
FIG. 3 is a schematic flowchart of a fusion of local features of each layer according to an embodiment of the present invention.

Furthermore, based on the local features of each layer of the color feature map and the local features of each layer of the depth feature map, the color map structure and the depth map structure are respectively constructed; in this process, the color map structure is used to represent the positional relationship between object nodes in the color image, and the depth map structure is used to represent the positional relationship between object nodes in the depth image. According to the features of the nodes in the color map structure, sparse connections are used to connect the nodes of each layer in the color map structure, and the first local feature is obtained through the aggregation and update operations based on the GCN algorithm. According to the features of the nodes in the depth map structure, sparse connections are used to connect the nodes of each layer in the depth map structure, the second local feature is obtained through the aggregation and update operations based on the GCN algorithm. According to the features of the nodes in the color map structure and the features of the nodes in the depth map structure, sparse connections are used to connect the nodes of each layer in the color map structure with the nodes of the corresponding layers in the depth map structure. The third local feature is obtained through the aggregation and update operations based on the GCN algorithm. In addition, the concatenation processing and feature transformation are further performed on the first local feature, the second local feature, and the third local feature to obtain the final local features.

Exemplarily, in order to effectively fuse the complementary information of the two modalities based on the selected features, a hierarchical graph model $G=(V, E)$ is constructed to represent an indoor scene, in which V represents the local features selected above, and E represents the connections between nodes. V can be divided into two categories: 2D color map nodes $V_r$ and 3D depth map nodes $V_d$. In addition, E contains three parts: the connection between single-modal and single-scale, the connection between multi-modal and single-scale, and the connection between single-modal and multi-scale.

Single-modal single-scale graph connection: first the construction of a single-modal single-scale graphical model is considered. Each node contributes differently to the scene recognition task and should be differentiated in the graph modeling. In our graph model, the importance of each node is represented by its value in the attention map, where a larger value means a larger contribution to the scene recognition. In addition, the nodes in the graph are represented as high-dimensional feature map vectors in the channel direction, which helps to represent the key features in the scene. Specifically, we obtain a tensor with a shape (B, k, C) through the node selection in the previous step, which is denoted as $V_r^{(m)}=\{R_i^m | i=1, 2 \ldots k\}$, where m represents the m-th scale; next, taking m=1 as an example, we set k=16, which includes 1 main central node, 3 secondary main central nodes and 12 leaf nodes. In order to build intra-modal connections, 3 secondary primary hub nodes are connected to the main central node, and the rest of the leaf nodes are connected to the secondary main central nodes by means of Euclidean distance.

Multi-modal single-scale graph connections: even in the same scene, the local features of the two modalities are different. In other words, there is a semantic gap between the two modalities. In this regard, sparse connections between selected features of the two modalities are more suitable than full connections. When considering the connections of RGB and depth modalities, we only connect the corresponding main central nodes $R_1^1$ and $D_1^1$, and the secondary main central ones $\{R_2^1, R_3^1, R_4^1\}$ and $\{D_2^1, D_3^1, D_4^1\}$ are connected, respectively, where $R_j^i$ and $D_j^i$ represent the j-th node of the color map and depth map of the i-th layer, respectively.

Single-modal multi-scale graph connections: in order to take advantage of the multi-scale features, we also need to consider the connections at different scales in the graph. Furthermore, sparse connections are used to construct single-modal multi-scale graphs, considering that the propagation of node features across the entire graph can be completed in several iterations. Taking m=1 and m=2 as examples, the nodes of scale 1 are only connected to the main central nodes and secondary main central nodes corresponding to scale 2, respectively. That is, the main central nodes $R_1^1$ and $R_2^1$, and the secondary main central nodes $\{R_2^1, R_3^1, R_4^1\}$ and $\{R_2^2, R_3^2, R_4^2\}$ are connected, respectively, and the same is true for the depth image.

By means of effectively combining the multi-modal single-scale graph and the single-modal multi-scale graph, we obtain the final hierarchical graph. For each node $R_j^i$ and $D_j^i$, its updated representation can be learned by aggregating the features of its neighbors. Finally, the updated features are fused together to generate the final local representation for RGB-D scene recognition. Taking the number of pyramid layers as 3 as an example, the construction of the hierarchical graph model is shown in FIG. 3.

After obtaining the final local features, the color global features, the depth global features and the final local features are fused to obtain the multi-modal feature of the scene to be recognized; in addition, scene recognition is performed on the multi-modal features of the scene to be recognized so as to obtain a recognition result of the scene to be recognized.

Embodiment II

Figure 4:
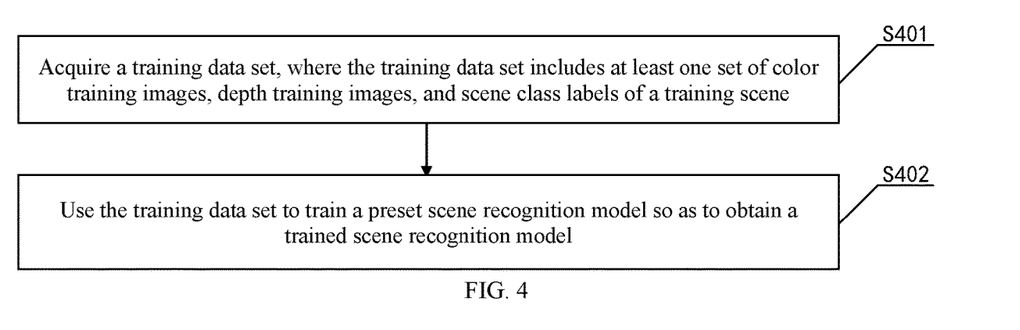
FIG. 4 is a schematic flowchart of a method for training a scene recognition model according to an embodiment of the present invention.

With reference to FIG. 4, which is a schematic flowchart of a training method for a scene recognition model provided by an embodiment of the present invention, the method includes the following steps:

S401: Acquire a training data set, where the training data set includes at least one set of color training images, depth training images, and scene class labels of a training scene.

S402: Use the training data set to train a preset scene recognition model so as to obtain a trained scene recognition model, where the trained scene recognition model is used to process the color training images and the depth training images according to the scene recognition method set forth in Embodiment I.

In this embodiment, the training data set may be a SUN RGBD data set or a NYU Depth v2 data set, or the like. The training data set includes several sets of training scenes, where each set of training scenes includes several training scenes, and each training scene has its corresponding color training images, depth training images, and scene class labels.

Further, the using of the training data set to train the preset scene recognition model includes: inputting the color training image and the depth training image into a preset scene recognition model, so that the preset scene recognition model performs feature extraction on the color training images and the depth training images, respectively; obtaining the color global training features corresponding to the color training images, the depth global training features corresponding to the depth training images, and the local training features of each layer; and fusing the color global training features, the depth global training features and the local training features of each layer to obtain the multi-modal training features of the training scene; and performing a parameter adjustment process on the preset scene recognition model based on the cross-entropy loss functions of the multi-modal training features and the scene class labels until the training is completed.

Specifically, not only the features of the two modalities are complementary, but also the global features and local features are both complementary for scene recognition. As mentioned above, $F_r$ and $F_d$ represent the feature maps of the last layer of the RGB and depth modalities, respectively. The global features $F_r^G$ and $F_d^G$ are obtained based on $F_r$ and $F_d$ in a fully connected layer. At the same time, two cross-entropy loss functions are used for the learning of global features respectively. In addition, the local features learned through the hierarchical graph model can be represented as $F_{rd}^L$. Further, the local features $F_{rd}^L$ are concatenated with the global features $F_r$ and $F_d$ to obtain $F_{all}$ which can be further used for the final scene recognition:

$$F_{all}=\text{Cat}(F_r^G, F_d^G, F_{rd}^L)$$

wherein Cat represents the concatenation operations.

Finally, the final scene recognition result can be predicted by an additional cross-entropy loss function. The overall loss consists of three parts: 1) the global feature loss $\zeta_r^G$ and $\zeta_d^G$; 2) the final classification loss $\zeta_{rd}^L$; and 3) the similarity loss $\zeta^{sim}$. The overall loss $\zeta$ can be calculated by the following formula:

$$\zeta=\zeta_r^G+\zeta_d^G+\zeta_{rd}^L+\zeta^{sim}$$

where $\zeta^{sim}=\zeta_r^{sim}+\zeta_d^{sim}$, $$\zeta_r^{sim}=\sum_{i=1}^{m}\|SA_r^{F(i)}-SA_r^{S(i)}\|^2,$$

and the calculations for $\zeta_d^{sim}$ is the same as that of $\zeta_r^{sim}$.

It should be noted that, in the testing phase, we only use $F_{all}$ for the final scene recognition task.

Embodiment III

Figure 5:
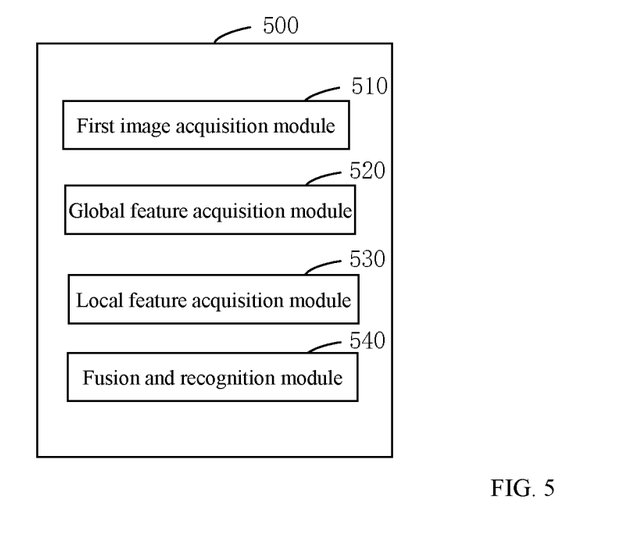
FIG. 5 is a structural block graph of a scene recognition device based on pyramid attention according to an embodiment of the present invention.

With reference to FIG. 5, the present invention provides a scene recognition apparatus 500 based on pyramid attention provided by certain embodiment(s) of the present invention. The apparatus 500 includes:

A first image acquisition module 510, which is used to obtain the color images and the depth images of the scene to be recognized, and perform feature extraction respectively to obtain the corresponding color feature map and depth feature map;

A global feature acquisition module 520, which is used to perform feature transformation on the color feature map and the depth feature map respectively to obtain corresponding color global features and depth global features;

A local feature acquisition module 530, which is used to perform pyramid layering on the color feature map and the depth feature map respectively, and calculate the corresponding attention map of each layer and the output of the attention based on the attention mechanism; take the output of the attention of the last layer as the final feature map of the last layer, for the remaining layers, the result after upsampling the final feature map of the previous layer is added to the output of the attention of this layer as the final feature map of this layer; scale the attention map and the final feature map corresponding to each of the layers so as to obtain two new attention maps; take the average of the two new attention maps as the final attention map, and then map the largest k position in the final attention to the final feature map of this layer so as to obtain the local features of this layer;

A fusion and recognition module 540, which is used to fuse the color global features, the depth global features and the local features of each layer to obtain multi-modal features of the scene to be recognized, and perform scene recognition based on the multi-modal features.

In this embodiment, for the specific implementation of each module, reference can be made to the descriptions provided in Embodiment I, which will not be repeated herein.

Embodiment IV

Figure 6:
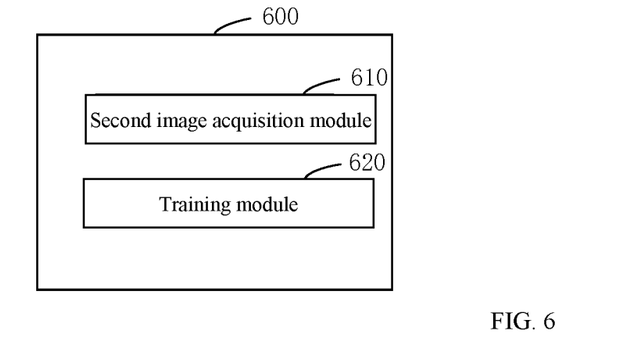
FIG. 6 is a structural block graph of an apparatus for training a scene recognition model according to an embodiment of the present invention.

With reference to FIG. 6, an apparatus 600 for training a scene recognition model provided by an embodiment of the present invention is shown, the apparatus 600 includes:

A second image acquisition module 610, which is used to acquire a training data set, where the training data set includes at least one set of color training images, depth training images and scene class labels of the training scene;

A training module 620, which is used to train a preset scene recognition model by using the training data set to obtain a trained scene recognition model, where the trained scene recognition model is used to process the color training images and the depth training images according to the scene recognition method set forth in Embodiment I.

In this embodiment, for the specific implementation of each module, reference can be made to the descriptions provided in Embodiment II, which will not be repeated herein.

A person skilled in the art can easily understand that the above descriptions are only some preferred embodiments of the present invention, and are not intended to limit the present invention. Any modifications, equivalent replacements and improvements made within the spirit and principles of the present invention shall fall within the scope of protection of the present invention.

The invention claimed is:

1. A method for scene recognition based on pyramid attention, characterized in that the method comprises:
   acquiring a color image and a depth image of a scene to be recognized, and performing feature extraction respectively to obtain a corresponding color feature map and a depth feature map;
   performing feature transformation on the color feature map and the depth feature map respectively to obtain corresponding color global features and depth global features;
   performing pyramid layering on the color feature map and the depth feature map respectively, and calculating an attention map and an attention output corresponding to each layer based on an attention mechanism; taking an attention output of a last layer as a final feature map of the last layer, and for remaining layers, adding a result of upsampling a final feature map of an upper layer to an attention output of this layer as a final feature map of this layer;
   scaling the attention map and the final feature map of each layer of the layers to obtain two new attention maps; using averages of the two new attention maps as a final attention map, and mapping a largest k position in the final attention map to the final feature map of this layer to obtain local features of this layer; and fusing the color global features, the depth global features and the local features of each layer to obtain multi-modal features of the scene to be recognized, and then perform scene recognition based on the multi-modal features.

2. The method according to claim 1, wherein the scaling of the attention map and the final feature map of each layer of the layers to obtain the two new attention maps comprises:
performing summation and reshape operations along a column direction on the attention map corresponding to each layer of the layers to obtain a new attention map; and
performing a two-dimensional convolution operation on the final feature map corresponding to each layer of the layers to obtain another new attention map.

3. The method according to claim 1, wherein the fusing of the color global features, the depth global features and the local features of each layer to obtain the multi-modal features of the scene to be recognized comprises:
performing a semantic-based feature fusion on the local features of each layer with a GCN algorithm to obtain the final local features; and
fusing the color global features, the depth global features and the final local features to obtain the multi-modal features of the scene to be recognized.

4. The method according to claim 3, wherein the performing of the semantic-based feature fusion on the local features of each layer with the GCN algorithm to obtain the final local features comprises:
respectively creating a color map structure and a depth map structure based on the local features of each layer of the color feature map and the local features of each layer of the depth feature map, wherein the color map structure is configured to represent a positional relationship between object nodes in the color image, and the depth map structure is configured to represent a positional relationship between object nodes in the depth image;
employing sparse connections to connect nodes in each layer in the color map structure based on features of the nodes in the color map structure, and obtaining a first local feature by means of aggregation and update operations of the GCN algorithm;
employing sparse connections to connect nodes in each layer in the depth map structure based on features of the nodes in the depth map structure, and obtaining a second local feature by means of aggregation and update operations of the GCN algorithm;
employing sparse connections to connect the nodes in each layer in the color map structure with the nodes in each layer in the depth map structure based on the features of the nodes in the color map structure and the features of the nodes in the depth map structure, and obtaining a third local feature by means of aggregation and update operations of the GCN algorithm; and
performing a concatenation operation and feature transformation on the first local feature, the second local feature, and the third local feature to obtain the final local features.

5. An apparatus for scene recognition based on pyramid attention, wherein the apparatus comprises:
a first image acquisition module, which is configured to acquire a color image and a depth image of a scene to be recognized, and perform feature extraction respectively to obtain a corresponding color feature map and a depth feature map;
a global feature acquisition module, which is configured to perform feature transformation on the color feature map and the depth feature map respectively to obtain corresponding color global features and depth global features;
a local feature acquisition module, which is configured to perform pyramid layering on the color feature map and the depth feature map respectively, and calculate an attention map and an attention output corresponding to each layer based on an attention mechanism; take an attention output of a last layer as a final feature map of the last layer, and for remaining layers, add a result of upsampling a final feature map of an upper layer to an attention output of this layer as a final feature map of this layer; scale the attention map and the final feature map of each layer of the layers to obtain two new attention maps; use averages of the two new attention maps as a final attention map, and map a largest k position in the final attention map to the final feature map of this layer to obtain local features of this layer; and
a fusion and recognition module, which is configured to fuse the color global features, the depth global features and the local features of each layer to obtain multi-modal features of the scene to be recognized, and then perform scene recognition based on the multi-modal features.

6. An electronic device, wherein the device comprises a memory and at least one processor;
the memory storing computer-executable instructions; and
the at least one processor executing the computer-executable instructions stored in the memory to cause the at least one processor to perform:
acquiring a color image and a depth image of a scene to be recognized, and performing feature extraction respectively to obtain a corresponding color feature map and a depth feature map;
performing feature transformation on the color feature map and the depth feature map respectively to obtain corresponding color global features and depth global features;
performing pyramid layering on the color feature map and the depth feature map respectively, and calculating an attention map and an attention output corresponding to each layer based on an attention mechanism: taking an attention output of a last layer as a final feature map of the last layer, and for remaining layers, adding a result of upsampling a final feature map of an upper layer to an attention output of this layer as a final feature map of this layer;
scaling the attention map and the final feature map of each layer of the layers to obtain two new attention maps: using averages of the two new attention maps as a final attention map, and mapping a largest k position in the final attention map to the final feature map of this layer to obtain local features of this layer; and
fusing the color global features, the depth global features and the local features of each layer to obtain multi-modal features of the scene to be recognized, and then perform scene recognition based on the multi-modal features.

7. A non-transitory computer-readable storage medium, wherein the computer-readable storage medium stores computer-executable instructions, and when a processor executes the computer-executable instructions, the processor performs:

acquiring a color image and a depth image of a scene to be recognized, and performing feature extraction respectively to obtain a corresponding color feature map and a depth feature map;

performing feature transformation on the color feature map and the depth feature map respectively to obtain corresponding color global features and depth global features;

performing pyramid layering on the color feature map and the depth feature map respectively, and calculating an attention map and an attention output corresponding to each layer based on an attention mechanism; taking an attention output of a last layer as a final feature map of the last layer, and for remaining layers, adding a result of upsampling a final feature map of an upper layer to an attention output of this layer as a final feature map of this layer;

scaling the attention map and the final feature map of each layer of the layers to obtain two new attention maps; using averages of the two new attention maps as a final attention map, and mapping a largest k position in the final attention map to the final feature map of this layer to obtain local features of this layer; and     fusing the color global features, the depth global features and the local features of each layer to obtain multi-modal features of the scene to be recognized, and then perform scene recognition based on the multi-modal features.

\* \* \* \* \*